(12) United States Patent
Cho

(10) Patent No.: US 10,871,014 B2
(45) Date of Patent: Dec. 22, 2020

(54) HOOK FOR OPENING AND CLOSING CONSOLE BOX

(71) Applicant: NIFCO KOREA INC., Asan-si (KR)

(72) Inventor: Tae Hyung Cho, Asan-si (KR)

(73) Assignee: NIFCO KOREA INC., Asan-si (KR)

( * ) Notice: Subject to any disclaimer, the term of this patent is extended or adjusted under 35 U.S.C. 154(b) by 225 days.

(21) Appl. No.: 15/913,112

(22) Filed: Mar. 6, 2018

(65) Prior Publication Data

US 2018/0195323 A1     Jul. 12, 2018

Related U.S. Application Data

(63) Continuation of application No. PCT/KR2016/009900, filed on Sep. 5, 2016.

(30) Foreign Application Priority Data

Sep. 8, 2015    (KR) .......................... 10-2015-0127195

(51) Int. Cl.
    *E05C 3/14*        (2006.01)
    *E05B 83/32*     (2014.01)
    (Continued)

(52) U.S. Cl.
    CPC .................. *E05C 3/14* (2013.01); *B60R 7/06* (2013.01); *E05B 83/32* (2013.01); *E05C 3/008* (2013.01); *E05C 19/12* (2013.01)

(58) Field of Classification Search
    CPC ......... Y10T 292/0911; Y10T 292/0926; Y10T 292/0934; Y10T 292/0951;
    (Continued)

(56) References Cited

U.S. PATENT DOCUMENTS 3,161,923 A * 12/1964 Crain .................. E05B 65/0835
                                                            292/128
3,797,870 A * 3/1974 Beckman .................. E05C 3/14
                                                             70/84

(Continued)

FOREIGN PATENT DOCUMENTS

CN          1629438 A      6/2005
EP          0587014 A2 *   3/1994          B60R 7/04

(Continued)

OTHER PUBLICATIONS

Japan Patent Office, "Office Action for Japanese Patent Application No. 2018-512271," dated Jan. 22, 2019.

(Continued)

*Primary Examiner* — Alyson M Merlino
(74) *Attorney, Agent, or Firm* — Manabu Kanesaka

(57) ABSTRACT

A hook device for opening and closing a console box with a console lid includes a hook body, a hinge shaft formed in the hook body and adapted to engage a lower front of the console lid, a knob protruding from the hook body in one direction at a center front where the hinge shaft is formed at the upper part, and a latch protrusion formed at a lower part of the hook body and protruding in a direction opposite to the one direction in which the latch protrusion is arranged to engage with and release from a latch formed at a front end of an upper surface of the console body. The hinge shaft protrudes to left and right sides at an upper part of the hook body.

1 Claim, 3 Drawing Sheets

(51) Int. Cl.
*E05C 19/12* (2006.01)
*B60R 7/06* (2006.01)
*E05C 3/00* (2006.01)

(58) Field of Classification Search
CPC ......... Y10T 292/0952; Y10T 292/0953; Y10T 292/0957; Y10T 292/0959; Y10T 292/1043; Y10T 292/1051; Y10T 292/1061; Y10T 292/1083; Y10T 292/1084; Y10T 292/1085; Y10T 292/1091; Y10T 292/1092; Y10T 292/444; E05C 3/14; E05C 3/124; E05C 3/008; E05C 3/006; E05C 19/10; E05C 19/12; E05B 83/28; E05B 83/32; E05B 17/0041; E05B 17/0045; B65D 43/22; B65D 45/16; B65D 45/22; Y10S 292/11; Y10S 292/30; Y10S 292/73; Y10S 292/56; Y10S 292/57
See application file for complete search history.

(56) References Cited

U.S. PATENT DOCUMENTS

| | | | | | |
|---|---|---|---|---|---|
| 3,876,104 | A | * | 4/1975 | Minsky | B65D 45/24 220/318 |
| 4,358,141 | A | | 11/1982 | Hamada | |
| 4,424,993 | A | * | 1/1984 | Shelby | E05C 3/14 292/128 |
| 4,893,850 | A | * | 1/1990 | Mizusawa | E05C 3/14 292/128 |
| 5,123,681 | A | * | 6/1992 | Kos | E05C 19/06 292/87 |
| 5,234,124 | A | * | 8/1993 | Buckner, III | B65D 45/20 220/326 |
| 5,478,126 | A | * | 12/1995 | Laesch | E05B 83/32 292/87 |
| 5,583,612 | A | * | 12/1996 | Schell | E05C 3/14 292/80 |
| 5,868,478 | A | * | 2/1999 | Yemini | E05C 3/14 292/107 |
| 6,055,700 | A | * | 5/2000 | Holsten | E05C 3/14 15/327.2 |
| 6,951,318 | B1 | * | 10/2005 | Petersen | E05C 3/14 220/315 |
| 7,093,865 | B2 | | 8/2006 | Furuya | |
| 7,552,951 | B2 | * | 6/2009 | Kim | E05B 83/32 292/113 |
| 2004/0189015 | A1 | * | 9/2004 | Antos | E05C 3/14 292/180 |
| 2010/0066221 | A1 | * | 3/2010 | Hakemann | E05C 3/124 312/296 |
| 2011/0133506 | A1 | | 6/2011 | Woo | |
| 2011/0241358 | A1 | * | 10/2011 | Washio | E05B 83/32 292/128 |

FOREIGN PATENT DOCUMENTS

| | | | |
|---|---|---|---|
| JP | H06-081527 A | | 3/1994 |
| JP | 2005-178672 A | | 7/2005 |
| JP | 2009-067362 A | | 4/2009 |
| JP | 2012-162188 A | | 8/2012 |
| JP | 2014-151807 A | | 8/2014 |
| KR | 10-1999-0027445 A | | 4/1999 |
| KR | 10-2005-0025715 A | | 3/2005 |
| KR | 1020050025715 A | * | 3/2005 ............ E05B 83/32 |
| KR | 10-1187069 B1 | | 9/2012 |

OTHER PUBLICATIONS

PCT/ISA/210, "International Search Report for International Application No. PCT/KR2016/009900," dated Dec. 8, 2016.
China Patent Office, "Office Action for Chinese Patent Application No. 201680051650.6," dated Apr. 3, 2020.

* cited by examiner

HOOK FOR OPENING AND CLOSING CONSOLE BOX

CROSS-REFERENCE TO RELATED APPLICATION

This is a continuation application of PCT/KR2016/009900 filed on Sep. 5, 2016 claiming a priority of Korean Patent Application No 10-2015-0127195 filed on Sep. 8, 2015, the disclosure of which is incorporated herein.

TECHNICAL FIELD

The present invention relates to a hook for opening and closing a console box, and more particularly to a hook for opening and closing a console box so as not to generate a frictional sound and at the same time to improve an operation feeling even if the hook is operated so that a locking force of a console lid is released.

BACKGROUND ART

In General, a console body installed on an upper surface of vehicle indoor's bottom is provided between front vehicle seats in which a predetermined receiving space is formed in the console body and a console lid is openably and closably provided over an upper part of the console body.

Meanwhile, the console body is formed to be protruded upwardly in a predetermined height, so that the receiving space where an upper part is opened upwardly is formed in the inside of the console body, a latch means is formed at a front end of the upper surface and a rear end of the console lid covering the upper part of the receiving spaces is rotatably supported by a hinge at a rear end of the upper surface, whereby the upper part of the receiving spaces can be opened and closed since a rear end of the console lid rotates on the hinge.

Further, an upper surface of the console lid is curved and a hook is equipped with a front end of a bottom surface thereof in which the hook is engaged with and released from the latch means, so that the front end is rotated and moved up and down on a rear end supported by the hinge and the rotation is stopped by engaging and releasing the hook of the front end to the latch means of the console body.

In general, in such a console box for a vehicle, the console lid can be rotated by releasing the hook from the latch means and if a user raises a front end of the console lid, the receiving space of the console body is opened, so that the user can store any goods to keep inside the receiving space of the console body in a vehicle indoor.

In this case, a conventional hook (100') for opening and closing a console box, as shown in FIG. 1, comprises a hinge shaft (130') engaged with a lower front of the console lid (300') in which the hinge shaft (130') is formed to be protruded to left and right sides at an upper part, a knob (110') formed to be protruded at a center front where the hinge shaft (130') is formed at the upper part, and a latch protrusion (120') formed to be protruded backward in which the latch protrusion (120') is engaged with and released from a latch means (210') formed at a front end of an upper surface of the console body (200') at a lower part where the knob (110') is formed to be protruded forward.

This conventional hook (100') for opening and closing a console box, in case that the hinge shaft (130') is engaged with the lower front of the console lid (300') in a state that the knob (110') formed at the center front is in an outer direction, is rotated on the hinge shaft (130') depending on a pressure condition exerted to the knob (110'), and the latch protrusion (120') formed to be protruded backward at the lower part is engaged with and released from the latch means (210') formed at the front end of the upper surface of the console body (200'), whereby the console lid (300') receives a locking or an unlocking force.

However, this conventional hook (100') for opening and closing a console box has a disadvantage that a frictional sound is generated by directly contacting a rear part of the hook (100') to the console lid (300') and the console body (200') when operating the hook, and this causes displeasure to persons in a vehicle.

Meanwhile, when operating the above hook (100'), an operation feeling is reduced, causing a problem such as debasement of a commodity value of a vehicle.

PRIOR ART DOCUMENT

Patent Document

Patent Document 1: Korean Patent Publication No. 10-2005-0025715, published on 14 Mar. 2005
Patent Document 2: Korean Patent Publication No. 10-1999-0027445, published on 15 Apr. 1999

DISCLOSURE OF INVENTION TECHNICAL

Problem

The present invention is derived to resolve the problems of the prior art as discussed above and has an object to provide a hook for opening and closing a console box wherein a person in a vehicle does not feel displeasure caused by a frictional sound, by preventing contacting a rear part of the hook to a console lid and a console body when operating the hook.

Another object of the present invention is to provide a hook for opening and closing a console box so as to improve a commodity value of a vehicle, by improving an operation feeling when operating the hook.

Solution to Problem

In order to achieve the above and any other objects of the present invention, according to one aspect of the present invention, there is provided a hook for opening and closing a console box comprising: a hinge shaft (130) engaged with a lower front of a console lid (300) in which the hinge shaft (130) is formed to be protruded to left and right sides at an upper part, a knob (110) formed to be protruded at a center front where the hinge shaft (130) is formed at the upper part and a latch protrusion (120) formed to be protruded backward in which the latch protrusion (120) is engaged with and released from the latch means (210) formed at a front end of an upper surface of the console body (200) at a lower part where the knob (110) is formed to be protruded forward, which is the same as the prior art as discussed above.

While, the present invention is further achieved by an elastic bumper (140) which is integrally formed at a rear part of the hook (100) where the knob (110) is formed to be protruded forward.

Meanwhile, a non-slip protrusion (111) is formed to be protruded downward at a bottom surface of the knob (110), so that a slip does not occur even if the knob (110) is lifted upward to exert a load in a state that fingers contact a lower part of the knob (110), thereby improving an operation feeling when operating the hook (100).

Advantageous Effects of Invention

According to the present invention structured as above, when operating the hook, the elastic bumper formed at the rear part of the hook contacts the console lid and the console body and absorbs the impact, whereby a frictional sound is not generated when operating the hook, as well as a commodity value of a vehicle is improved by improving an operation feeling when operating the hook.

BEST MODE FOR CARRYING OUT THE INVENTION

Hereinafter, a preferred embodiment of the present invention will be described in detail with reference to the accompanying drawings.

Figure 1:
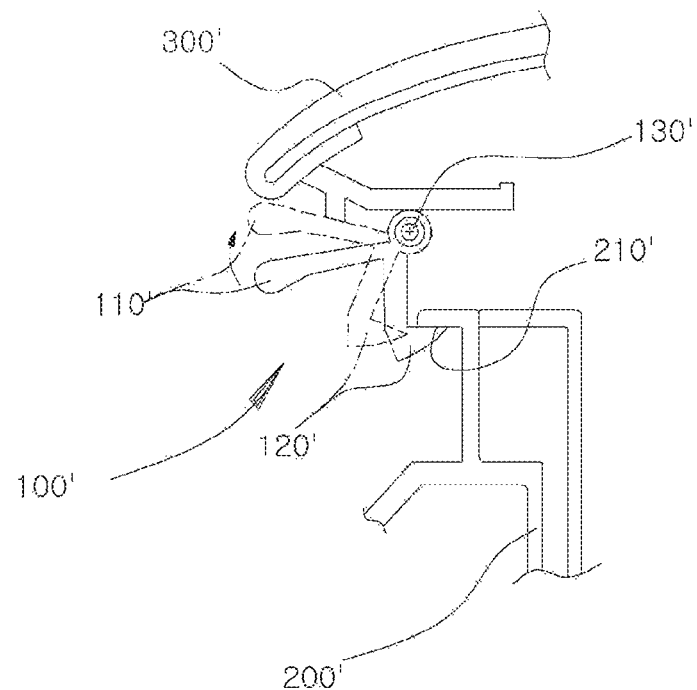
FIG. 1 shows a cross sectional view of a conventional hook for opening and closing a console box, where the hook is in the installed state.
Figure 2:
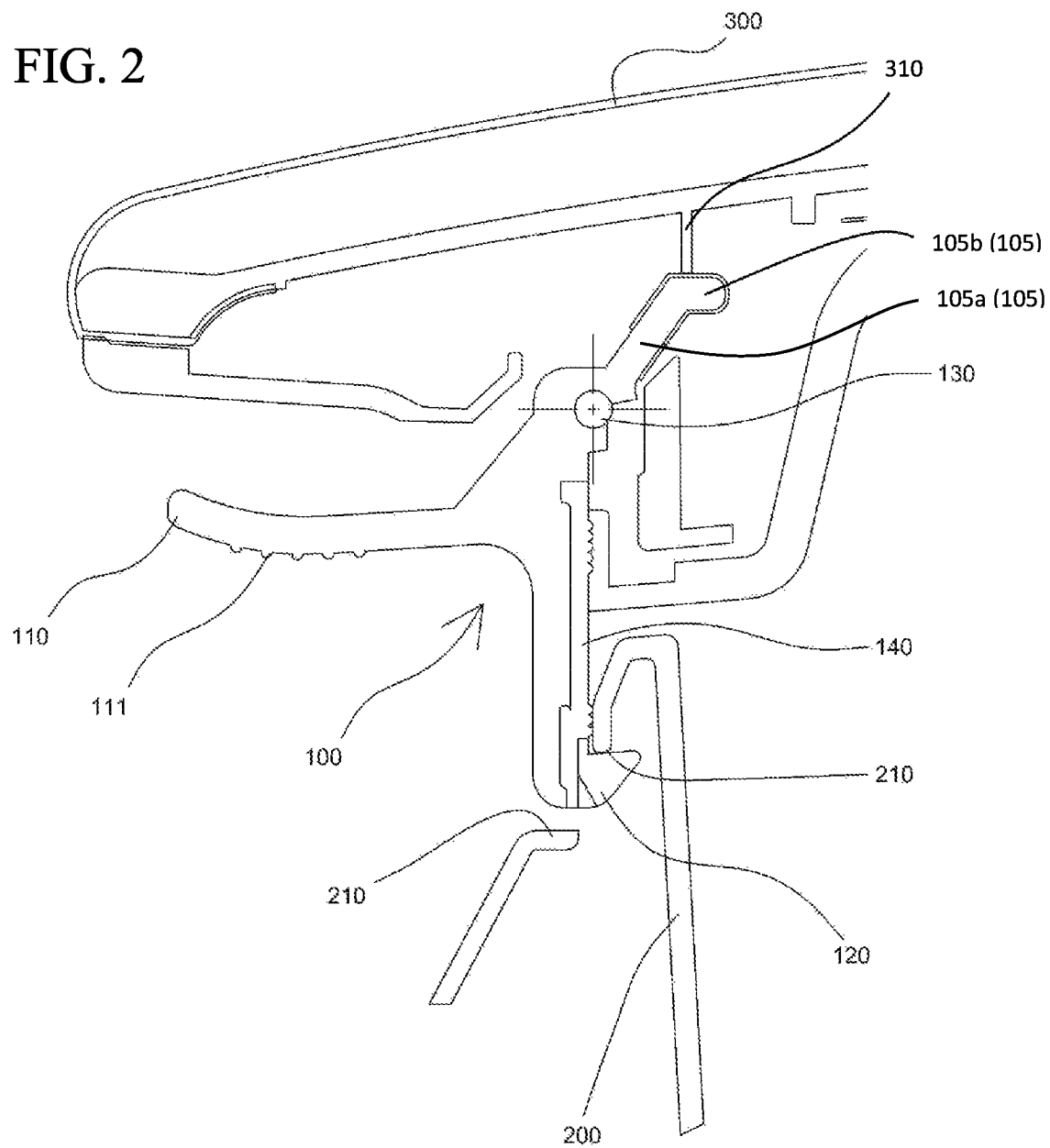
FIG. 2 shows a cross sectional view of a hook for opening and closing a console box according to the present invention, where the hook is in the installed state.
Figure 3:
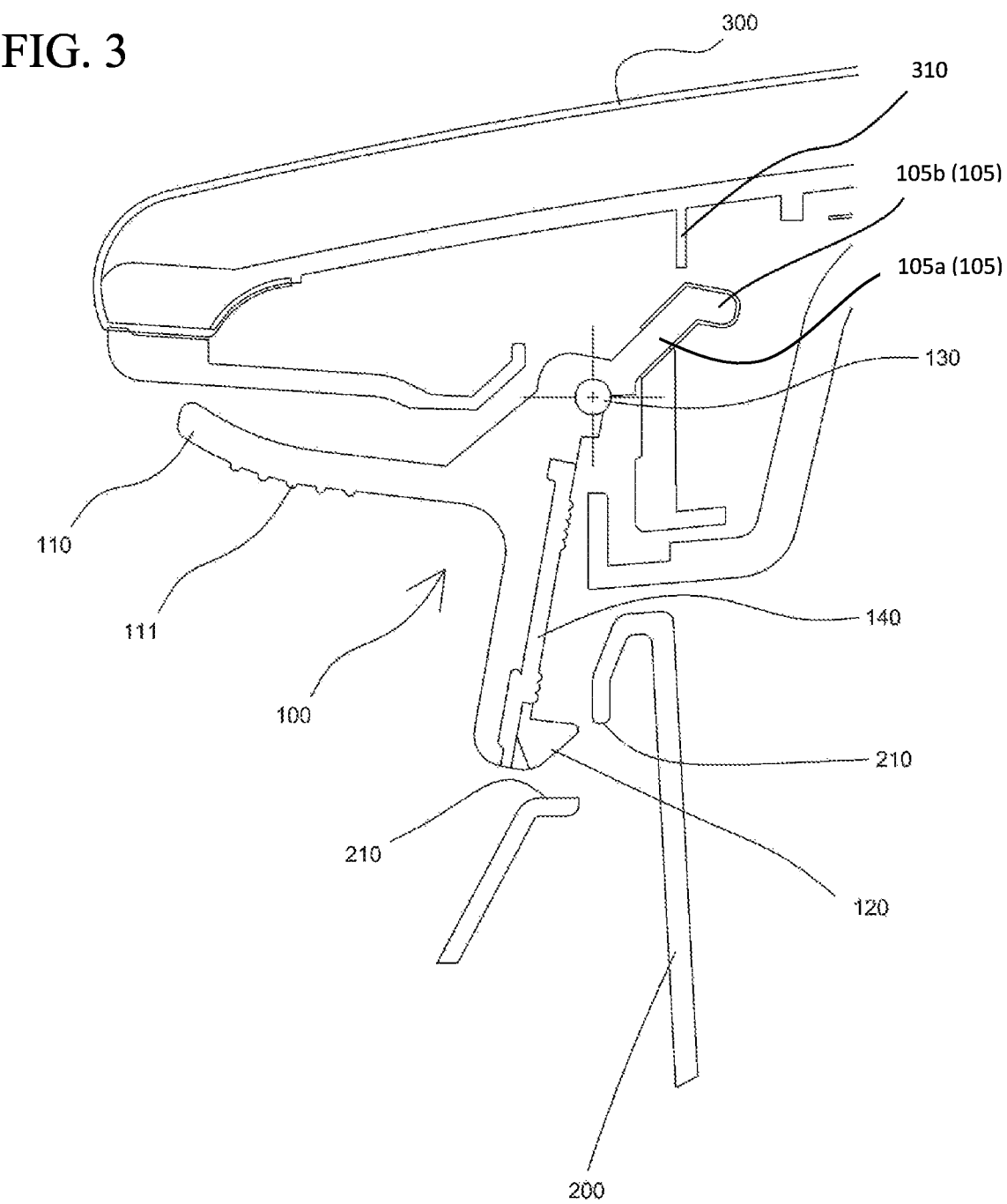
FIG. 3 shows a cross sectional view of a hook for opening and closing a console box according to the present invention, where a locking force of the hook is to be released in the operational state.

FIG. 2 shows a cross sectional view of a hook for opening and closing a console box according to the present invention, where the hook is in the installed state, and FIG. 3 shows a cross sectional view of a hook for opening and closing a console box according to the present invention, where a locking force of the hook is to be released in the operational state.

A hook for opening and closing a console box according to the present invention, as shown in FIG. 2 and FIG. 3, comprises:

a hinge shaft (130) engaged with a lower front of a console lid (300) in which the hinge shaft (130) is formed to be protruded to left and right sides at an upper part;

an engaging portion (105) including a first section (105a) protruding upwardly from the hinge shaft (130) at an upper part of the hook body, and a second section (105b) extending from an end of the first section (105a) backward and engaging an engaged portion (310) of the console lid (300);

a knob (110) formed to be protruded at a center front where the hinge shaft (130) is formed at the upper part; and a latch protrusion (120) formed to be protruded backward in which the latch protrusion (120) is engaged with and released from a latch means (210) formed at a front end of an upper surface of the console body (200) at a lower part where the knob (110) is formed to be protruded forward.

Meanwhile, it is to be understood that an elastic bumper (140) made of rubber can be inserted into the rear part of the hook (100) where the knob (110) is formed to be protruded forward or a TPE (Thermoplastic elastomer) material is integrally formed with the elastic bumper (140) such as two color molding manner.

Further, a non-slip protrusion (111) is formed to be protruded downward at a bottom surface of the knob (110).

In the present invention being configured as above, in a state that the knob (110) formed at the center front is in an outer direction, the hinge shaft (130) is engaged with the lower front of the console lid (300).

Consequently, the hook (100) is rotated on the hinge shaft (130) depending on a pressure condition exerted to the knob (110); and the latch protrusion (120) formed to be protruded backward at the lower part is engaged with and released from the latch means (210) formed at the front end of the upper surface of the console body (200), and the engaging portion (105) formed to be protruded backward at the upper part is engaged with and released from the engaged portion (310) formed at the inner surface of the console lid (300), thereby allowing the console lid (300) to be locked or unlocked.

At this time, in a state that fingers contact the non-slip protrusion (111) formed to be protruded downward at the bottom surface of the knob (110), when lifting the knob (110) upward and rotating it on the hinge shaft (130) so as to remove the locking force, a slip of fingers does not occur by the non-slip protrusion (111), thereby improving an operation feeling when operating the hook (100).

Moreover, when removing the load exerted to the knob (110) so as to provide the hook (100) with the locking force, the knob (110) is rotated on the hinge shaft (130), as shown in FIG. 3, the latch protrusion (120) is engaged with the latch means (210) formed at the console body (200) and the locking force is provided to the console lid (300) so as not to be opened.

At this time, an outer surface of the elastic bumper (140) formed at the rear part of the hook (100) contacts an outer surface of the console body (200) and the console lid (300), thereby absorbing the frictional sound generated when operating the hook (100).

Brief Explanation of Reference Symbol

| 100 | hook | 110 | knob |
|---|---|---|---|
| 111 | non-slip protrusion | 120 | latch protrusion |
| 130 | hinge shaft | 200 | console body |
| 140 | elastic bumper | 210 | latch means |
| 300 | console lid | | |

The invention claimed is:

1. A hook device for opening and closing a console box with a console lid, the hook device comprising:

a hook body;

a hinge shaft formed in the hook body and adapted to engage a lower front of the console lid, the hinge shaft protruding to left and right sides at an upper part of the hook body;

an engaging portion including a first section protruding upwardly from the hinge shaft at the upper part of the hook body, and a second section extending from one end of the first section in one direction and adapted to engage an engaged portion of the console lid;

a knob protruding from a front portion of the hook body in another direction, opposite to the one direction, at the upper part of the hook body, and including at least one non-slip protrusion formed on a bottom surface thereof;

a latch protrusion protruding from a lower part of the hook body in the one direction, the latch protrusion being adapted to engage with and release from a latch formed at a front end of an upper surface of a console body of the console box; and an elastic bumper integrally formed in the hook body at a rear portion opposite to the knob and linearly extending from the latch protrusion toward the hinge shaft, terminating at a horizontal position of the knob to absorb frictional sound when the hook body contacts the console body and the console lid when the latch protrusion is engaged with the latch.

\* \* \* \* \*